(12) United States Patent
Warner

(10) Patent No.: US 7,279,127 B2
(45) Date of Patent: Oct. 9, 2007

(54) CONTINUOUS STEELMAKING PLANT

(76) Inventor: Noel Alfred Warner, 40 High House Drive, Birmingham, West Midlands (GB) B45 8ET ( * ) Notice: Subject to any disclaimer, the term of this patent is extended or adjusted under 35 U.S.C. 154(b) by 42 days.

(21) Appl. No.: 10/521,307

(22) PCT Filed: Jul. 15, 2003

(86) PCT No.: PCT/GB03/03069

§ 371 (c)(1),
(2), (4) Date: Jan. 13, 2005

(87) PCT Pub. No.: WO2004/007778

PCT Pub. Date: Jan. 22, 2004

(65) Prior Publication Data

US 2005/0269752 A1    Dec. 8, 2005

(30) Foreign Application Priority Data

Jul. 17, 2002  (GB) ................................ 0216544.7

(51) Int. Cl.
*C21C 5/00*    (2006.01)

(52) U.S. Cl. ................ 266/142; 266/901; 266/161

(58) Field of Classification Search ................ 266/200, 266/142, 901, 161
See application file for complete search history.

(56) References Cited

U.S. PATENT DOCUMENTS 3,658,119 A * 4/1972 Hunt et al. .................. 164/512
4,027,722 A * 6/1977 Hunt ............................ 266/208
4,701,217 A * 10/1987 Warner ........................ 75/500
5,628,958 A * 5/1997 Frank .......................... 266/901

* cited by examiner

*Primary Examiner*—Scott Kastler

(57) ABSTRACT

The present invention provides a process plant for the production of molten steel from primary and/or secondary ferrous materials in which no free oxygen is permitted to contact directly carbon-containing iron melts, comprising:—i) at least three pairs of furnaces (1,2; 3,4;5,6), each furnace of a pair having a hearth base (36) and being interconnected so as to form a continuous flowpath loop for molten metal, the first pair (1,2) defining an iron making loop (A) and the second and third pair (3,4;5,6) defining primary and secondary steel refining loops (B,C) respectively, (ii) means (8) for transferring molten metal from the ironmaking loop (A) to the first refining loop (B) and from the first refining loop (B) to the second refining loop (C), (iii) means for controllably supplying heat to, and removing heat from metal in the furnaces (1,2,3,4,5,6), whereby, in use a central region of metal (19*a*) in the furnace (1,2,3,4,5,6) becomes or is maintained in its molten state and a peripheral region of the metal (20) is maintained in a solid state such that the molten metal (19*a*) is contained within a stable solid shell of metal (20), said solid metal shell (20) defining the walls of the furnace (1,2,3,4,5,6), (iv) for each furnace (1,2,3,4,5,6), a removable lid (23), an enclosed space (25) being defined between the hearth (36), the lid (23) and the solid metal shell (20) defining the walls of the furnace (1,2,3,4,5,6), (v) a lifting arrangement (34,35) for controllably raising out of and lowering into the melt any plant items, so that upon shut down, said items can be removed prior to solidification of the molten metal (19*a*).

7 Claims, 2 Drawing Sheets

CONTINUOUS STEELMAKING PLANT

Figure 1:
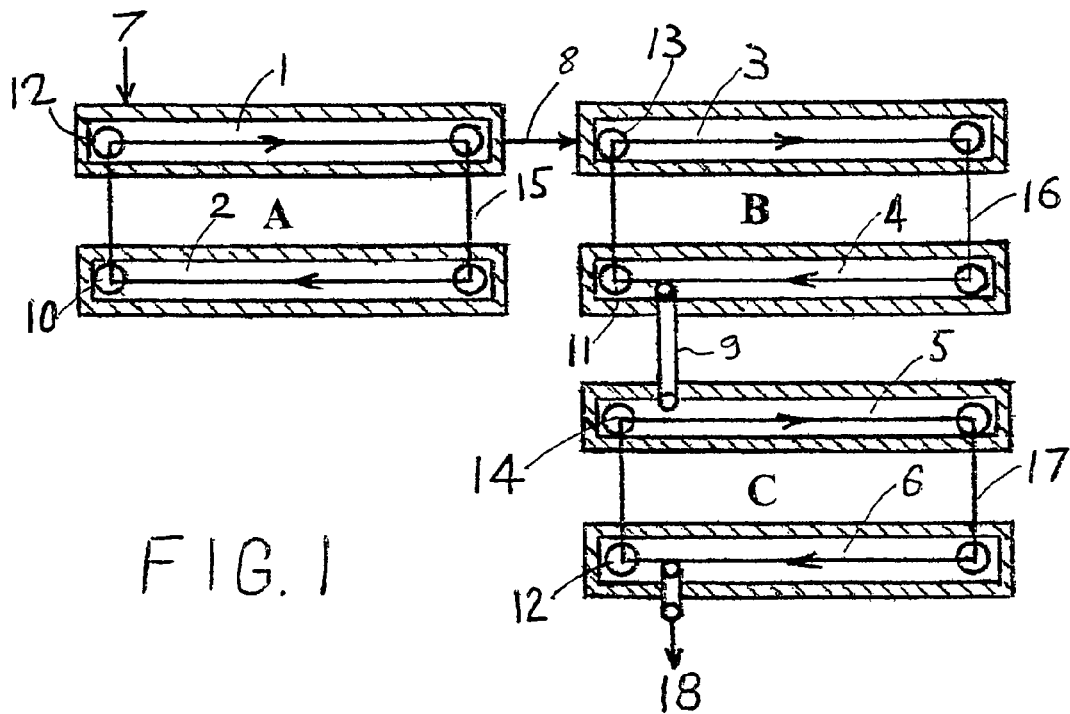

This invention relates to the production of molten steel of closely controlled composition directly from iron ore fines, non-coking coal and flux material. More particularly, the present invention is concerned with providing a practical means for establishing, maintaining in stable operation, taking-off-line for maintenance or planned shut-downs and re-starting a process employing a number of melt circulation loops arranged in series to effect integrated iron making and steelmaking on a truly continuous basis.

EP 0266975 and U.S. Pat. No. 4,701,217 disclosed the use of a stationary or slowly moving protective molten layer below the relatively fast moving layer of carrier material to reduce the erosion of the hearth or floor of the furnace in which smelting reduction is taking place in a melt circulation loop. This method is satisfactory for the examples cited in which a molten matte phase is the carrier material and the protective layer can then be a denser metallic alloy, but use of molten lead in steelmaking or refined ferroalloy production introduces environmental and health and safety issues, which are better avoided if at all possible.

There is a well known technique for melting and refining titanium and other reactive metals referred to as cold hearth refining. Cold hearth refining is named as such because of the use of a water-cooled copper hearth, which has solidified molten titanium in contact with it and in which a skull of the material being melted is formed. The molten titanium being refined then flows across the solidified skull, which becomes the conduit. At first sight, experts would dismiss this approach for iron and steelmaking on the grounds that energy losses involved in very large scale processing would make this approach hopelessly uneconomic.

It is an object of the present invention to provide a process plant capable of cost-effective continuous steelmaking.

Accordingly, the invention provides a process plant for the production of molten steel from primary and/or secondary ferrous materials in which no free oxygen is permitted to contact directly carbon-containing iron melts, comprising:

(i) at least three pairs of furnaces, each furnace of a pair having a hearth base and being interconnected so as to form a continuous flowpath loop for molten metal, the first pair defining an iron making loop and the second and third pair defining primary and secondary steel refining loops respectively, (ii) means for transferring molten metal from the ironmaking loop to the first refining loop and from the first refining loop to the second refining loop, (iii) means for controllably supplying heat to, and removing heat from metal in the furnaces, whereby, in use a central region of metal in the furnace becomes or is maintained in its molten state and a peripheral region of the metal is maintained in a solid state such that the molten metal is contained within a stable solid shell of metal, said solid metal shell defining the walls of the furnace, (iv) for each furnace, a removable lid, an enclosed space being defined between the hearth, the lid and the solid metal shell defining the walls of the furnace, (v) a lifting arrangement for controllably raising out of and lowering into the melt any plant items, so that upon shut down, said items can be removed prior to solidification of the molten metal.

The present invention arises from the inventors realisation that if the cold hearth were not actually cold but at a temperature of say 800° C. or even hotter and the concept was developed for a generation of high pressure steam under benign conditions for advanced power generation from readily available coal resources and preferably with virtually zero gas emission after carbon dioxide sequestration, then detailed assessment yields a totally different answer and could provide the key to continuous steelmaking for the future.

Increased electrical demand must flow from the introduction of zero emission technology and in the present case the need for air separation and $CO_2$ sequestration sometime in the future is readily apparent. If it is accepted that plant electrical requirements using coal and generated in-house using near to zero gas emissions may be superior to buying in electricity or at least competitive in the broader sense, when taking into account the whole production process, then it is immaterial how the steam is raised for power generation provided it is safe, reliable and cost-effective.

Direct radiation from the external surfaces of the various frozen walls and hearths is potentially as good as any other way to generate high pressure steam. Staged oxygen combustion throughout the entire melt circulation circuit of the gases from the charge arm of the iron making loop in association with melt circulation and controlled extraction of heat from walls and hearths, whilst transferring heat to the top hearth and melt surfaces by radiation and top blowing/direct flame impingement, has in effect provided a large surface area ideally suited to radiative heat transfer to boiler tubes under benign conditions. The intensity of heat release is compatible with the requirements for supercritical steam raising, including those required for the EC Thermie Programme, where efficiencies in excess of 50% are projected. However, for the present purposes sub-critical steam may be preferred, even though preliminary calculations indicate the system is ideally suited to supercritical conditions.

Returning to the frozen shells themselves, the key issue is to identify the most effective way of holistically conducting both steelmalcing and power generation together. Provided the overall energy balance permits diversion of heat to frozen shells as proposed, there would seem to be no rational impediment to its implementation. There is, of course, a limit to the amount of heat which is available for this purpose and it can be shown that the maximum rate of heat flow permissible for say a 500,000 tpa virgin steel plant employing melt circulation would be somewhere in the region of 30-40 MW. A viable means by which frozen shells can be adopted throughout the entire circuit, while keeping below the level specified above, has been identified. The major assumptions made and the various considerations are summarized in what follows.

(1) The convective heat flux from the bulk of the liquid metal to the solid lining is determined by the product of the heat transfer coefficient and the temperature driving force.

(2) The melt circulation rate is very large in comparison with the steel production rate, so the carbon concentration in a particular loop is virtually constant.

(3) If the temperature of a thermal sink adjacent to the cooler side of the freeze lining is fixed, as for example by having steam tubes undergoing boiling imbedded in the sink, then in response to changes in heat flux both the thickness of the freeze lining and the temperature of the cooler side will adapt to establish or restore steady state conditions.

(4) Solid-liquid transformation processes in either direction on the hotter side of the lining will take place heterogeneously only on the face of the freeze lining rather than in the bulk of the liquid metal. This assumes that supersaturation levels are not excessive, or in other words thermal changes or concentration levels do not alter very abruptly.

(5) At the elevated temperatures involved solid-liquid transformation take place rapidly and equilibrium is established at the solid/liquid interface, or in phase diagram terms for a given temperature these are the solidus and liquidus compositions.

(6) To avoid nucleation and growth of solid phases within the bulk of the liquid metal, the lowest temperature in a particular loop is limited to the liquidus temperature.

(7) The highest temperature required in the circulating liquid metal in a particular loop is a function of how much each has to be transported by the liquid between arms of the loop and also the amount of heat to be transferred by flame impingement and other mechanisms.

With improvement in refractories, the erosion of the furnace hearths for melt circulation processes involving ferrous metals can be contained, but clearly it would be better to eliminate the potential problem by a totally new approach. Although not immediately obvious, the melt containment problem is aggravated for the larger scale operations such as direct continuous steelmaking, where process engineering calculations indicate the need for reactors of swimming pool size as opposed to the relatively smaller horizontal or vertical vessels used in other bath smelting processes. Whilst replacement of refractory linings at the sides of such furnaces is possible without closing down the plant, it is difficult if not impossible to replace the refectory of the hearths. With "swimming pool" reactors the other issue of concern is what to do with the metal contents of a pool if a hearth repair or replacement is needed. A related but still important issue is an effective way of bringing a swimming pool reactor back on-line after repair and, indeed, the problem of start-up in the first instance. All these issues may be disadvantageous to the widespread use of melt circulation technology in practice. The invention obviates or mitigates these disadvantages.

Furthermore, as we move towards a hydrogen economy, there will still be a need to decarburise iron melts containing minor amounts of carbon to produce refined steel. In this case the gas phase will be principally hydrogen diluted with nitrogen or just hydrogen. The gaseous mixture required for primary and secondary steel making will be $N_2/H_2O$ ensuring that no free oxygen comes into direct contact with carbon containing molten iron anywhere in the process. If hydrogen were to be used in curent steel making processes in this manner, there would be problems associated with corrosion of the refractories with high liquid iron oxide containing slags which do not pose a problem with a solid iron containment system.

The process is designed to take place in three melt circulation loops each comprised of two parallel "swimming pool reactors". There are no connections to the hearths or walls of these swimming pool reactors, but rather all access is from above whether that be gas-lift snorkels, melt siphons or top blow lances. This approach facilitates the establishment of pools of molten metal totally contained by a solidified shell of material of similar composition and completely eliminates concerns about hearth erosion and slag/metal attack on refractories. The external surfaces of the solidified iron shell may optionally be clad with heat resistant alloy to protect against oxidation and scaling as well as providing mechanical strength and dimensional stability.

During start-up, temporary shutdowns or planned prolonged periods off-line, the various pool ancillaries are raised and kept in the up position to enable a low voltage, heavy current mains frequency three-phase AC electric circuit to be established using transformed mains electrical supply for direct resistance or "so-called" conductive heating. The provision of three independent melt circulation loops permits phase balancing of the mains power supply without undue complexity or expense. In normal operation the solidified shell is maintained at its steady state thicknesses by radiation to steam boiler tubes associated with an advanced reheat steam turbine for power generation. This will provide all the electricity needed both for air separation and carbon dioxide liquefaction prior to its sequestration in accordance with a near to zero gas emission operating philosophy without external input.

If heat is extracted from the walls and base of a very large solid slab of iron while a heavy alternating current is passed from one end to the other, in due course a liquid pool will be formed, which can be maintained as such under melt circulation conditions by controlling the current input. Similarly, the provision of heat to the top surface of either side of a melt circulation loop by post-combustion radiant heat transfer, by direct flame impingement, or top blowing at the same time as heat is being extracted both to satisfy process requirements and through the base and walls to an external sink, the molten pool can be maintained under melt circulation conditions after the current flow has been switched off. This is the rationale behind the design of the swimming pool reactor system and is the basis of the assertion that slag/metal attack and hearth erosion will be completely eliminated by this novel approach.

However, for those hearths in which the oxygen potential of the gas is higher than that for metallic iron stability, steps clearly have to be taken to protect the exposed surfaces of solid iron from oxidation. A system has been devised to accomplish this by shielding the exposed areas and purging the immediate surrounds with gas not oxidizing to iron. Nitrogen or argon cannot be used for this purpose, because their presence in the process off-gas would complicate $CO_2$ separation and its ultimate disposal. It is estimated that some 20-25 pct of reducing gas produced in the iron making loop will be needed for this purpose, bearing in mind that at least three of the six hearths will have gas atmospheres already not oxidizing to iron. All this purge gas ends up in the principal gas flow to be finally combusted in the post combustion (PC) arm of the iron making loop so there are no losses as such.

Without taking positive steps there could still be a potential problem with sulphidation of exposed solid iron surfaces at high temperature. Exposed areas in both the iron making arm and the metallised raft melting arm will require shielding and purging with low sulphur gas because the raw gas in both of these will contain enough sulphur to cause problems, if appropriate steps were not taken.

Figure 2:
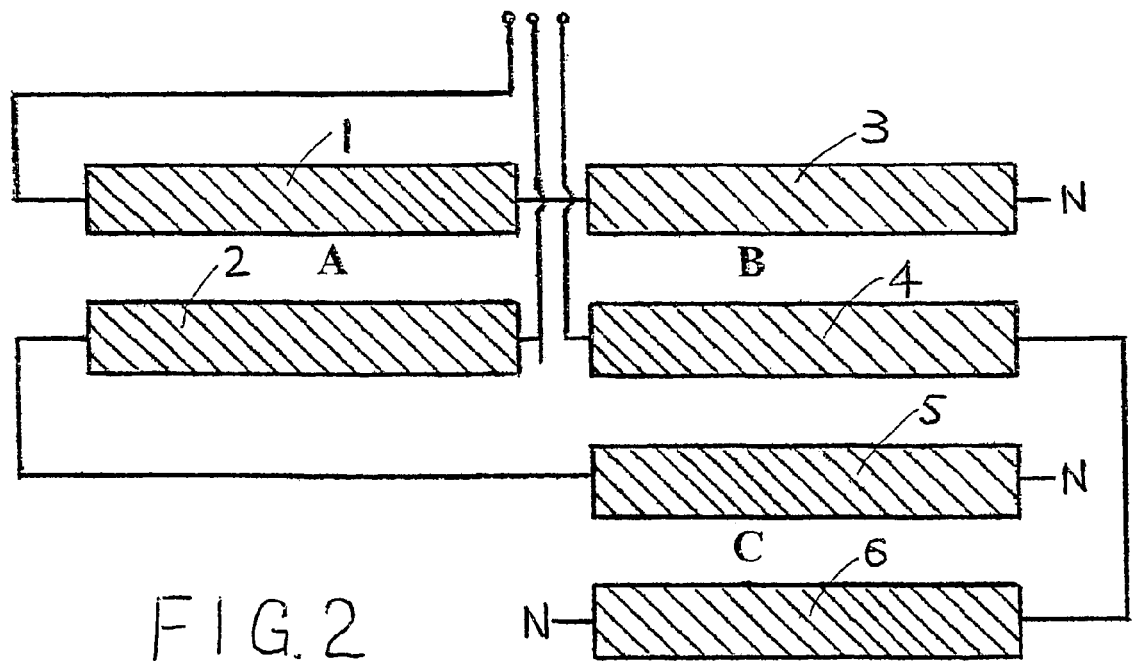
Figure 3:
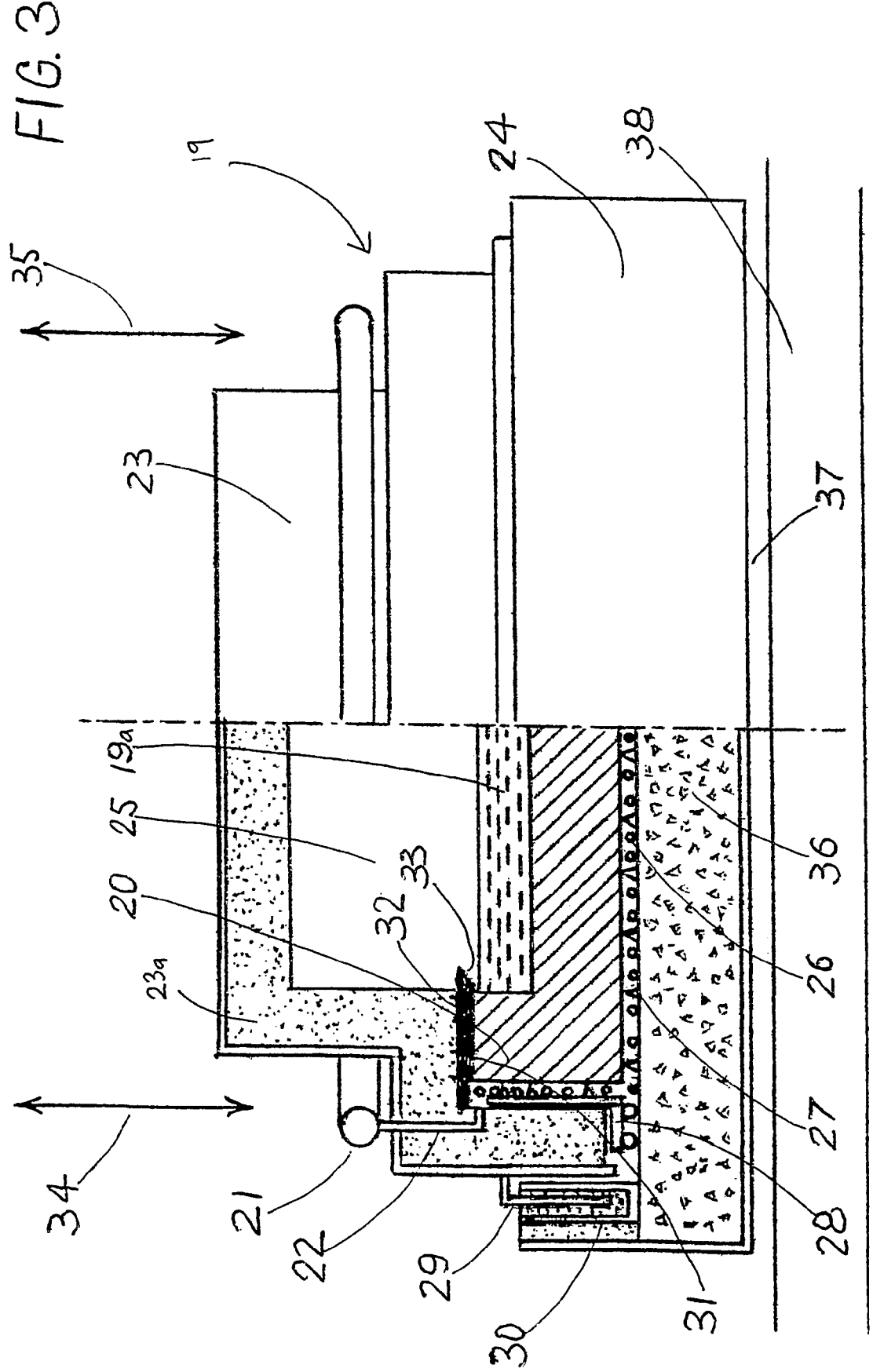

An embodiment of the present invention will now be described, by way of example only, with reference to the accompanying drawings, in which:

FIG. 1 is a schematic sectional plan view, which removes details of gas ducting and the like from view, of a coal-based continuous steel making plant for virgin ore as the sole source of iron units, in which the method of the present invention can be performed, FIG. 2 is a schematic general arrangement in sectional plan of three melt circulation loops connected electrically to form a balanced circuit for a three-phase alternating current power supply when all pools are totally solidified as after a prolonged stoppage or as for initial start-up, and FIG. 3 is a schematic half sectional elevation view across the width of one of the "swimming pool" reactors, showing the solid shell of iron for containment of the circulating molten iron, the means for protecting exposed solid iron surfaces from oxidation or sulphidation, the general configuration of the steam boiler tubes for power generation, the arrangements for sealing the liftable top enclosure, the method for accommodating thermal expansion of the solid shell and the general features of the basal assembly.

Referring now to FIG. 1, the plant comprises six furnaces ("swimming pool reactors") 1, 2, 3, 4, 5 and 6, which are arranged in pairs to form three inter-linked melt circulation loops A (an iron making loop), B and C (first and second refining loops) formed by interconnecting the first and second hearths 1 and 2 (constituting a charge reduction and a desulphurisation/heating zone respectively), the third and fourth hearths 3 and 4 (constituting a melting zone and a desulphurisation/decarburisation zone) and the fifth and sixth hearths 5 and 6 respectively. Under steady operating conditions, molten metal is caused to overflow or be otherwise taken out of the second and third loops B and C by conductively heated siphons 9 and 18 so that molten metal issuing from these is equivalent to the metal in the composite charge 7 initially added to the top surface of the molten carrier material at the upstream end of the first hearth 1, together with any scrap or pre-reduced material added to the circuit (not shown). At the downstream end of the first hearth 1, a channel or ramp 8 is provided to permit solid material (metallised raft) floating on the surface of the molten carrier material in the first hearth 1 to be propelled or projected into the third hearth 3 onto the surface of the molten carrier material in the first refining loop B, along with a lesser amount of molten carrier material from the reduction loop A, corresponding to new metal assimilated into the carrier material in reduction loop A, resulting from any smelting reduction talking place between the floating charge layer, ultimately becoming an agglomerated solid structure referred to as the metallised raft as it progresses downstream in the first hearth 1.

The hearths 1,2,3,4,5,6 contain pools of molten iron, each having decreased levels of carbon concentration in the order A, B, C. Molten iron is the direct product of smelting reduction of iron oxide ore and therefore contains minor amounts of the usual incidental impurities C, Si, Mn, P and during the process of steel making these impurities are refined down to low levels to comply with specification limits to form steel. Hereinafter, the liquid metal in each of the three loops will be referred to simply as molten iron. Because the molten iron circulation rate within each loop vastly exceeds the rate at which metal is actually produced from the composite charge 7, the melt composition can be considered uniform throughout each loop and therefore equal to that of the metal overflown or otherwise extracted from each loop sequentially from B to C via siphon 9 and finally from C via siphon 18 to supply, for example, a continuous casting machine or optionally, further continuous refining to ultra-low carbon steel (ULC) in a tower refiner (not shown).

As will be explained in further detail below, the Molten pools of iron are contained within frozen shells of iron, the frozen shells defining the walls of the furnaces. Under normal operating conditions, an energy balance is maintained so that the thickness of the frozen shell is substantially constant.

For given melt circulation rates in the various loops, the molten iron composition and temperatures in each loop are determined by the physical dimensions of the pools 1, 2, 3, 4, 5 and 6, the amount and composition of solid feed material introduced at 7, the rate of oxygen addition and where in the overall circuit it is added and in what proportion it is relative to the gas flow rate at the particular point of addition. A major influence is also exerted by the molten iron circulation rates in each of the loops, A the iron making loop, B the primary steel making loop and C the secondary steel making loop. The circulation rate of molten iron in each of these loops is distinctly different and is controlled by the rate at which an inert gas is injected into the upleg snorkels 10, 11 and 12 of gas-lift pumps (RH-type) as used in steel vacuum degassing worldwide, which extend into the molten iron at the downstream ends of the second, fourth and sixth hearths 2, 4 and 6. The downleg snorkels 12a, 13 and 14 extend down into the molten pools at the upstream ends of the first, third and fifth hearths 1, 3 and 5. At the opposite end of all hearths, siphons 15, 16 and 17 of similar design to the gas-lift pumps are extended down into the molten iron to interconnect the first and second hearths 1 and 2, the third and fourth hearths 3 and 4 and the fifth and sixth hearths 5 and 6. All the snorkels of the gas-lift pumps and the siphons are joined immediately above to bodies (not shown) in which a reduced pressure is maintained to effect forced circulation of molten iron in a closed loop path.

The gas-lift pump and siphon devices can be lifted out of the molten iron to leave rectangular pools of molten iron of the size and shape of swimming pools, hence reference to the hearths as swimming pool reactors.

Heat can be extracted directly by thermal radiation from the walls and bases of the swimming pool reactors for the generation of high pressure steam under benign conditions to facilitate the generation of electricity, employing either supercritical or subcritical steam conditions and an advanced reheat steam turbine cycle. Under steady operating conditions, the solidified shells in various parts of the overall circuit can be maintained at a pre-determined thickness by controlling the same variables as already referred to as determining melt composition and temperatures in the three loops, coupled with manipulation of steam raising conditions external to the frozen shells.

At the discretion of the process operator, the plant can be closed down by discontinuing feed to the iron making loop, turning off the oxygen and inert gas supplies and then raising the snorkels out of the pools. At this juncture the circuit consists of six rectangular pools of molten iron devoid of any ancillaries. Without the provision of heat input, the molten iron would begin freezing onto the solid iron shells and eventually six frozen solid pools, rather like skating rinks, would be all that remained. Before this happens, if the process is to be restarted after a temporary shutdown, it is desirable to maintain the steady-state shell thicknesses at their former levels. This can be achieved electrically by making use of the so-called skin effect, in which for large-size conductors supplied with alternating current at mains frequency, the current penetrates to a very limited extent and is confined to the skin on the outside. Accordingly, direct resistance or so-called conductive heating is the appropriate means to provide the heating required.

Referring now to FIG. 2, three-phase mains frequency electricity is reduced in voltage from transmission voltage to plant requirements by an appropriate step-down transformer station for the steel making plant. Depending on how the various pools are connected together, the voltages required to maintain the steady-state frozen shells depend on the electrical characteristics of the whole circuit, which includes the shells themselves and water-cooled bus system interconnecting the individual pools, which constitute the electrical load. In FIG. 2, 19 represents the regulated low voltage input supply to a circuit comprised of the six pools interconnected to each other to provide three equal loads. For the example shown, this is achieved by connecting 1 with 3, 2 with 5 and 4 with 6 to effect what is known as a star circuit. For this, if the loads are equally balanced there is no need for a fourth conductor, because there would be no net current flow in the neutrals, N, and the neutrals would be earthed. However, it is recognised that a four-wire system may be needed, if the loads are not identical. The alternative method of connecting the three electrical loads is a so-called delta circuit, which will not be shown as this is well known those skilled in the art.

As an indication of the voltages and currents involved in a real situation, the resistivity of Fe—C is about $1.39 \times 10^{-6}$ $\Omega$m and the skin depth at the melting point for 50 Hz is about 80 mm. For two nominal pools, each 6 m in overall width by 60 m in overall length, both connected in series the effective resistance is about $1.23 \times 10^{-4}$ $\Omega$. Based on resistance only for a power input of say 13.3 MW per phase, a potential difference of about 40 V would be required across the load and the current flow would be 330 kA. Voltages of this magnitude are normally considered low risk in terms of the electrocution, but clearly the relevant electrical code would have to be complied with. For the star connection shown in FIG. 2, this corresponds to a line voltage of 70 V to provide a total power input of about 40 MW to the six pools at a mean heat flux at the solid/liquid metal interface of 0.0136 MW/m$^2$. The voltages quoted above are indicative only, because they ignore mutual inductance. voltage drops in the water-cooled bus system and other electrical effects but are suitable for an initial appraisal of system feasibility.

Referring now to FIG. 3, the liquid metal pool 19a is non-specific but is representative of any of the six hearths 1, 2, 3, 4, 5 and 6. The solid iron shell established under steady operating conditions is shown as 20. A purge gas header 21 supplies ultra-low sulphur/non-oxidising to iron gas to a pipe 22, one of a number of such pipes attached to the header at various points along the length of the pool 19a. This purge gas on being admitted to the gas-tight enclosure, comprised of top-hat enclosure 23 and basal enclosure (hearth) 24, provides an inert gas atmosphere throughout the whole volume of the enclosure except for that containing reactive gas in the gas space 25 above the molten iron. Accordingly, protection is provided to the outer surfaces of the solid shell 20, steam boiler tubes 26 and ancillaries such as the heat resisting alloy components 27, which provide skid mounting at the base of the solid shell 20, and a sideways movement trolley 28 extending the length of the pool 19a, which is actuated so that it moves backwards and forwards as the solid shell 20 expands or contracts in width. The latter features are to combat stresses from thermal expansion and are designed to allow freedom of movement of the solid shell 20, particularly when totally solid at start-up or after prolonged shut-down. Both the skids and the trolley system are used in conjunction with heat resistant alloy plates to control creep and distortion of the solid shell 20 during prolonged operation at elevated temperature. It will be noted that the alloy components comprising the skid arrangement form an edge contact with the underside of the metal shells 20 and provide a small spacing between the boiler tubes 26 and the underside of the shells 20, so that heat transfer to the tubes 26 is radiative.

The top-hot enclosure is provided with a skirt 29, which is immersed in a channel 30 containing fusible alloy such as lead-bismuth eutectic, which forms a continuous seal around the perimeter. The channel or trough 30 containing the fusible alloy is attached to the basal enclosure 24 and is heated at all times by electrical conductive heating so that the top-hat enclosure 93 is free to thermally expand or contract, whilst always maintaining a leak-proof gas seal.

Inside the top-hat enclosure 23 a composite lining 23a of low-thermal mass insulating materials provides lightweight insulation and permits rapid heating after shut-down without fear refractory damage. On the highest temperature faces, high purity alumina fibrous board currently commercially available or microporous materials currently under development are used.

The purge gas enters the gas space 25 above the molten iron through a small clearance passageway 31, bounded by the top surface of the solid shell 20 on one side and on the other by several layers of ceramic fibre board 32 or comparable material, which is profiled to deliver a shroud of protective gas to the solid iron areas vulnerable to oxidation and possible sulphidation immediately above the molten metal surface. To achieve this, the boards 32 project a short distance into the reactive gas space 25, as shown schematically at 33. The purge gas velocity is controlled by varying the pressure upstream to the header 21 to preclude back diffusion of reactive gases to the exposed high temperature surfaces of solid iron.

Although not shown in FIG. 3, it will be necessary to control induced current effects in loops completely surrounding the heavy current-carrying solid shell and its molten iron contents. Those skilled in the art will recognise the need for this and will devise ways and means for breaking such circuits by electrically insulating such metallic loops so that induced currents are minimised or preferably completely eliminated.

For routine inspection or maintenance, means for lifting the top-hat enclosure 23, which is effectively a moveable lid on the "swimming pool" reactor 19a, must be included. The arrows shown as 34 and 35 signify such an arrangement, where the options include hydraulic hoists and gantry craneage. Because of the use of lightweight insulating materials without conventional refractory arches and brickwork, the lifting requirements for handling a one-piece fabricated top-hat enclosure 23 for say a 60 m length "swimming pool" reactor are not excessive and well within the bounds of commercial practice, particularly that associated with dry docking of ships and bulk loading of whole barge cargoes. Although not absolutely essential, it would be convenient to provide clear areas adjacent to the "swimming pools" so that individual top-hat enclosures can be parked nearby.

The fabricated steel basal enclosure 24 encases a refractory concrete or firebrick base 36 and structural steel members 37, which are the principal load bearing members for the whole "swimming pool" reactor. The structural supports are ventilated, possibly forcibly, to ensure the reinforced concrete floor 38 is not over-heated and not over-loaded. Because the solid shells are typically around 1 m in thickness, it is highly unlikely that a break-out of liquid metal should occur, but in the event, the large thermal mass of the firebrick lining can be regarded as a safety lining.

The invention claimed is:

1. A process plant for the production of molten steel from primary and/or secondary ferrous materials in which no free oxygen is permitted to contact directly carbon-containing iron melts, comprising:

(i) at least three pairs of furnaces, each furnace of a pair having a hearth base and being interconnected so as to form a continuous flowpath loop for molten metal, the first pair defining an iron making loop and the second and third pair defining primary and secondary steel refining loops respectively, (ii) means for transferring molten metal from the iron-making loop to the first refining loop and from the first refining loop to the second refining loop, (iii) means for controllably supplying heat to, and removing heat from metal in the furnaces, whereby, in use a central region of metal in the furnace becomes or is maintained in its molten state and a peripheral region of the metal is maintained in a solid state such that the molten metal is contained within a stable solid shell of metal, said solid metal shell defining the walls of the furnace, (iv) for each furnace, a removable lid, an enclosed space being defined between the hearth, the lid and the solid metal shell defining the walls of the furnace, (v) a lifting arrangement for controllably raising out of and lowering into the melt any plant items, so that upon shut down, said items can be removed prior to solidification of the molten metal.

2. A process plant as claimed in claim 1, wherein means are provided to maintain a gas-tight seal between each hearth and the associated lid.

3. A process plant as claimed in claim 2 wherein a bath of molten metal alloy is provided around each solid metal shell, each lid being provided with a downwardly depending skirt which in use extends into said bath of molten alloy whereby to form the gas-tight seal.

4. A process plant as claimed in claim 1, wherein the means for controllably heating includes gas combustion means arranged to heat the molten metal by direct flame impingement.

5. A process plant as claimed in claim 1, wherein the means for controllably removing heat from the metal includes boiler tubes mounted in close proximity to the solid metal shells to facilitate radiative heat transfer.

6. A process plant as claimed in claim 5, wherein said boiler tubes form part of a steam generator.

7. A process plant as claimed in claim 1, wherein a purge gas inlet is provided into the enclosed spaces in close proximity to the upper surfaces of the solid metal shells, whereby, in use, purge gas is introduced as required to maintain a non-oxidising atmosphere above the solid metal shells whilst maintaining oxidising conditions as required for decarburisation and post-combustion.

* * * * *